(12) United States Patent
Ullmann et al.

(10) Patent No.: US 6,711,573 B2
(45) Date of Patent: Mar. 23, 2004

(54) METHOD AND APPARATUS FOR APPLICATION EXECUTION OF DISTRIBUTED DATABASE SERVICE UPDATES

(75) Inventors: Lorin Evan Ullmann, Austin, TX (US); Michael John Burr, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 09/885,735

(22) Filed: Jun. 20, 2001

(65) Prior Publication Data

US 2002/0198880 A1 Dec. 26, 2002

(51) Int. Cl.[7] .............................................. G06F 17/30
(52) U.S. Cl. ...................................... 707/10; 707/104.1
(58) Field of Search ................................. 707/10, 104.1

(56) References Cited

U.S. PATENT DOCUMENTS

| | | | |
|---|---|---|---|
| 4,714,995 A | 12/1987 | Materna et al. ............. 364/200 |
| 5,577,206 A | 11/1996 | Friedrich et al. ........... 395/200 |
| 5,761,505 A | 6/1998 | Golson et al. .............. 395/653 |
| 5,822,531 A | 10/1998 | Gorczyca et al. ........ 395/200.5 |
| 5,961,642 A | 10/1999 | Lewis et al. .................... 713/1 |
| 5,964,872 A | 10/1999 | Turpin et al. .................. 713/1 |
| 6,014,669 A | 1/2000 | Slaughter et al. ............. 707/10 |
| 6,029,196 A | 2/2000 | Lenz et al. ................. 709/221 |
| 6,055,426 A | * 4/2000 | Beasley .................... 455/432.1 |
| 6,108,699 A | 8/2000 | Moiin et al. ................. 709/221 |
| 6,161,176 A | 12/2000 | Hunter et al. ................... 713/1 |
| 6,192,483 B1 | 2/2001 | Moiin et al. ..................... 714/4 |
| 6,363,411 B1 | * 3/2002 | Dugan et al. ............... 709/202 |
| 2002/0075844 A1 | * 6/2002 | Hagen ........................ 370/351 |
| 2002/0103660 A1 | * 8/2002 | Cramon et al. ................. 705/1 |
| 2002/0126812 A1 | * 9/2002 | Majewski et al. ...... 379/114.03 |

* cited by examiner

Primary Examiner—Wayne Amsbury
(74) Attorney, Agent, or Firm—Jeffrey S. LeBaw; Anne V. Dougherty

(57) ABSTRACT

A system and method for implementing distributed transactions using configuration data that is available to all applications which may wish to access the data. Added to the configuration data is at least one status indicator to allow applications to ascertain the status of updates without performing a database-specific distributed transaction. An application which is preparing to write/update stored information must first change the at least one status indicator associated with the underlying storage. Thereafter, any other application which has a need to read or write the stored information will readily ascertain the status of the stored information from the configuration data. The other application which has need of the data may choose to read the old and/or partially updated data or may wait until the update has been completed and the at least one status indicator has been changed to indicate completion of the update. Status indicators may be associated to entire nodes at which data is stored or to specific pieces (e.g., keys) of the stored data. Furthermore, the status indicator of the configuration data can be displayed to a user.

20 Claims, 4 Drawing Sheets

METHOD AND APPARATUS FOR APPLICATION EXECUTION OF DISTRIBUTED DATABASE SERVICE UPDATES

FIELD OF THE INVENTION

This invention relates to distributed computing systems and more particularly to a system and method for application execution of updates at a distributed database.

BACKGROUND OF THE INVENTION

Distributed data processing networks having thousands of nodes, or endpoints, are known in the prior art. The nodes can be geographically dispersed and the computing environment managed in a distributed manner with a plurality of computing locations running distributed kernels services (DKS). The managed environment can be logically separated into a series of loosely connected managed regions in which each region has its own management server for managing local resources. Under such an arrangement, the management servers coordinate activities across the network and permit remote site management and operation. Further, local resources within one region can be exported for the use of other regions in a variety of manners.

FIG. 1 provides a schematic illustration of a network for implementing the present invention. A network has many endpoints, with endpoint being defined, for example, as one Network Interface Card (NIC) with one MAC address, IP Address. Among the plurality of servers, 101a–101n as illustrated, at least one of the servers, 101a in FIG. 1, which has distributed kernel services (DKS), may be designated as a control server. Each server in the network is a multi-threaded runtime process that optimally includes an object request broker (ORB) which runs continuously, separate from the operating system, and which communicates with both server and client processes via an interprocess communication facility. The system management framework, or distributed kernel services (DKS) includes a client component supported on each of the endpoint machines. The client component is a low cost, low maintenance application suite that is preferably "dataless" in the sense that system management data is not cached or stored there in a persistent manner. It should be noted, however, that an endpoint may also have an ORB for remote object-oriented operations within the distributed environment.

Realistically, distributed networks can comprise millions of machines (each of which may have a plurality of endpoints) which are managed by thousands of control machines. The so-called control machines run Internet Protocol (IP) Driver Discovery/Monitor Scanners which poll the endpoints and gather and store status data, which is then made available to other machines and applications. A detailed discussion of distributed network services can be found in co-pending patent application, Ser. No. 09/738,307, filed Dec. 15, 2000, entitled "METHOD AND SYSTEM FOR MANAGEMENT OF RESOURCE LEASES IN AN APPLICATION FRAMEWORK SYSTEM", the teachings of which are herein incorporated by reference. Data storage and data sharing in a large-scale distributed network require that multiple applications have access to data which may be stored remotely and which may be replicated at multiple locations throughout the network. Furthermore, it is typical that more than one application will have write access to that data. Synchronizing the data to assure that replicated data is consistent is particularly challenging in the highly distributed environment.

Under the prior art, when writing to two databases, DB1 and DB2, in an effort to synchronize the data (i.e., performing a distributed transaction), the process would be as follows: the writer of the data would first format a prepared statement using the DB1 schema, populate the statement with data using the DB1 schema, and then write the data to DB1; next, a prepared statement would be formatted using the DB2 schema, the statement would be populated with DB2 data, and the data would then be written to DB2; finally, the system would wait for DB1 and DB2 to return "OK" messages, followed by committing DB1 and then committing DB2. Assuming that drivers at each machine had been modified to implement the foregoing, and that a third "party" was available to watch the transaction from start to finish to review the transaction, the process flow could be executed; however, when there are a large number of queued transaction per API, the possibility for failure will greatly slow the network.

Alternative solutions include having a master copy of the data, to which a local copy is synchronized. However, the foregoing requires more storage, and necessitates that a master database control the information, which is antithetical to the peer relationship needed for a fast, efficient highly distributed environment.

In a hierarchically-arranged network, transactions may be communicated "down the line" whereby an update can be implemented as a configuration change since the object request broker (ORB) for each machine will inherit the update from the ORB above in the hierarchy. However, such a method cannot be scaled to a loosely-coupled distributed system having thousands of machines wherein an application on any one of the machines has write access to data at another node. In addition, typical prior art update approaches utilize locking to block all other read and write access to data while an update transaction is executing. The prospect of locking out thousands of machines is not realistic in the distributed environment.

It is desirable, therefore, and an object of the present invention, to provide a system and method whereby an application can execute a database update without blocking access to the database.

It is another object of the present invention to provide a system and method whereby an application defines the granularity of access to a node and/or data stored at that node.

It is a further object of the present invention to provide a system and method whereby an application can implement the access and update status at the configuration system layer.

Still another object of the present invention is to provide a system and method whereby database update status can be communicated to another application seeking access to the database.

Yet another object of the present invention is to provide a system and method whereby application updates to data can be communicated on a per node or per data item basis.

It is also an object of the present invention to provide a system and method whereby a user can view a display of the update status of data in a distributed network.

SUMMARY OF THE INVENTION

The foregoing and other objectives are realized by the present invention which provides a system and method for implementing distributed transactions using configuration data that is available to all applications which may wish to access the data. Added to the configuration data is at least one status indicator to allow applications to ascertain the status of updates without performing a database-specific distributed transaction. An application which is preparing to write/update stored information must first change the at least one status indicator associated with the underlying storage. Thereafter, any other application which has a need to read or write the stored information will readily ascertain the status of the stored information from the configuration data. The other application which has need of the data may choose to read the old and/or partially updated data or may wait until the update has been completed and the at least one status indicator has been changed to indicate completion of the update. Status indicators may be associated to entire nodes at which data is stored or to specific pieces (e.g., keys) of the stored data. Furthermore, the status indicator of the configuration data can be displayed to a user.

DESCRIPTION OF THE DRAWINGS

The invention will now be described in greater detail with specific reference to the appended drawings wherein.

DESCRIPTION OF THE PREFERRED EMBODIMENT

Figure 1:
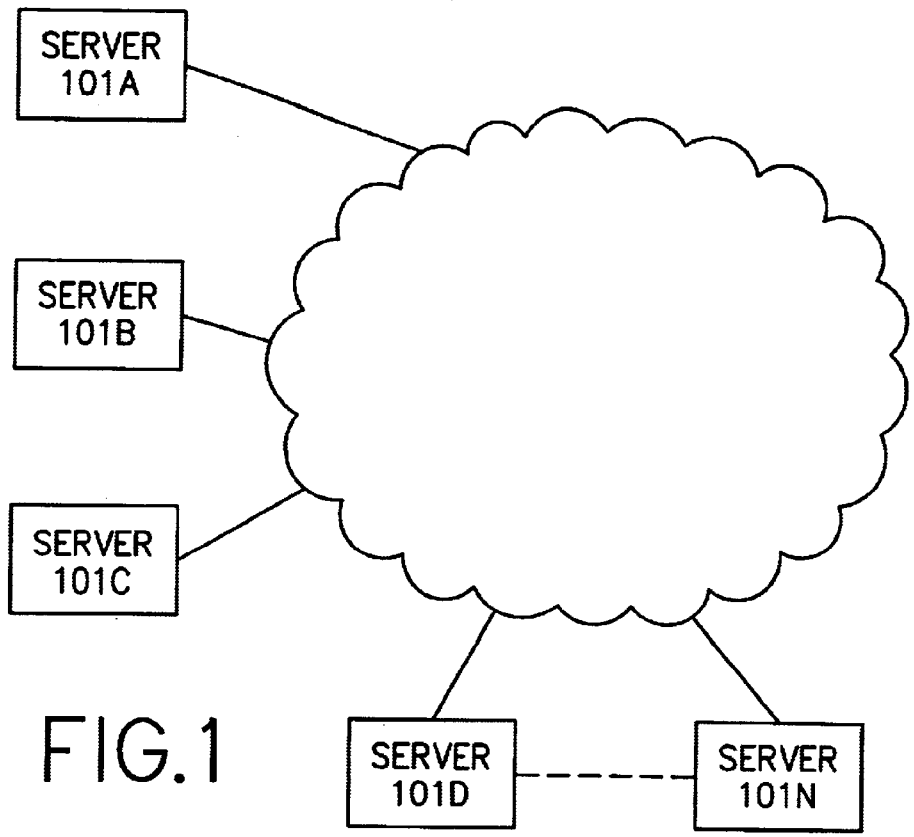
FIG. 1 provides a schematic representation of a distributed network in which the present invention may be implemented.

The present invention can be implemented in any network with multiple servers and a plurality of endpoints; and is particularly advantageous for vast networks having thousands of endpoints and links therebetween. As discussed above, FIG. 1 provides a schematic illustration of a network for implementing the present invention. Among the plurality of servers, 101a–101n as illustrated, at least one of the servers, 101a in FIG. 1, which already has distributed kernel services (DKS) may be designated as a control server for itself (i.e., its own ORB) or for a plurality of ORBs.

Figure 2:
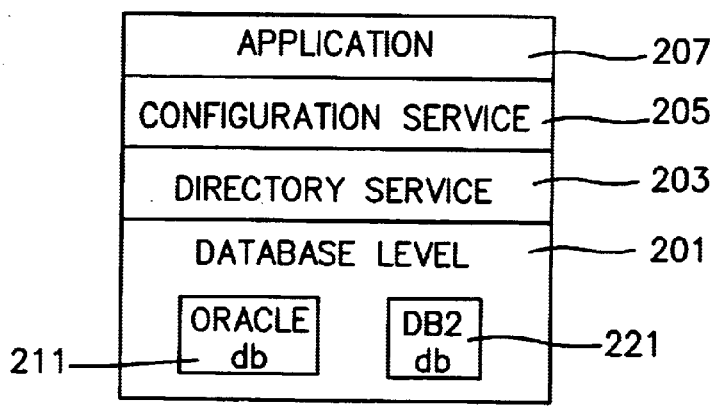
FIG. 2 provides a schematic representation of a data access framework for use in the distributed system.

To facilitate the sharing of resources and data, the DKS large-scale distributed systems provide a directory structure above the database storage level at each storage location for providing access to distributed data at the various storage locations throughout the network. FIG. 2 provides a schematic representation of a data access framework used in implementing a network using the DKS approach. Data is stored at database storage 201 with directory information (i.e., a property file having property key:value pairs) being stored at the directory structure 203. Any application from a client, server ORB, or group/set of ORBs can obtain the keys from the directory structure and can, once the keys have been obtained, then obtain the property values using the keys.

Furthermore, the present inventive system provides a configuration subsystem at 205, which is, conceptually, a layer on top of the directory service. The configuration subsystem uses the replicated data storage functions provided by the directory service, but adds additional functionality as further detailed below.

Given the distributed nature of the system, typically a plurality of applications from throughout the system will have read access to data in the database 201, and many of the plurality of applications will additionally have write access to the data. For performing read and write transactions in such a distributed networked system, current transaction-based technological approaches do not work since the configuration system is distributed across the thousands of remote machines. Adding a distributed transaction to a write to configuration data would imply that a configuration component has the ability to communicate the write to all of the thousands of machines. Clearly such is not a realistic approach. What the present invention provides is a system and method for effectively executing a distributed transaction using the configuration data which is available to all applications in the distributed system.

Added to the configuration data is at least one status indicator for representing the current update status of at least some of the information stored below the configuration structure at the location. The status indicator(s), referred to hereinafter as an "oktoread" indicator(s), may refer to the update status of an entire node's storage or of a single key which is stored at the node. An application which is preparing to write/update the stored information must first change the at least one oktoread indicator. Thereafter, any other application which has a need to read or write the stored information will readily ascertain the status of the stored information from the oktoread indicator in the configuration data. Any other application which has need of the data may choose to read the old and/or partially updated data or may wait until the update has been completed and the at least one oktoread indicator has been changed to indicate completion of the update.

Figure 3:
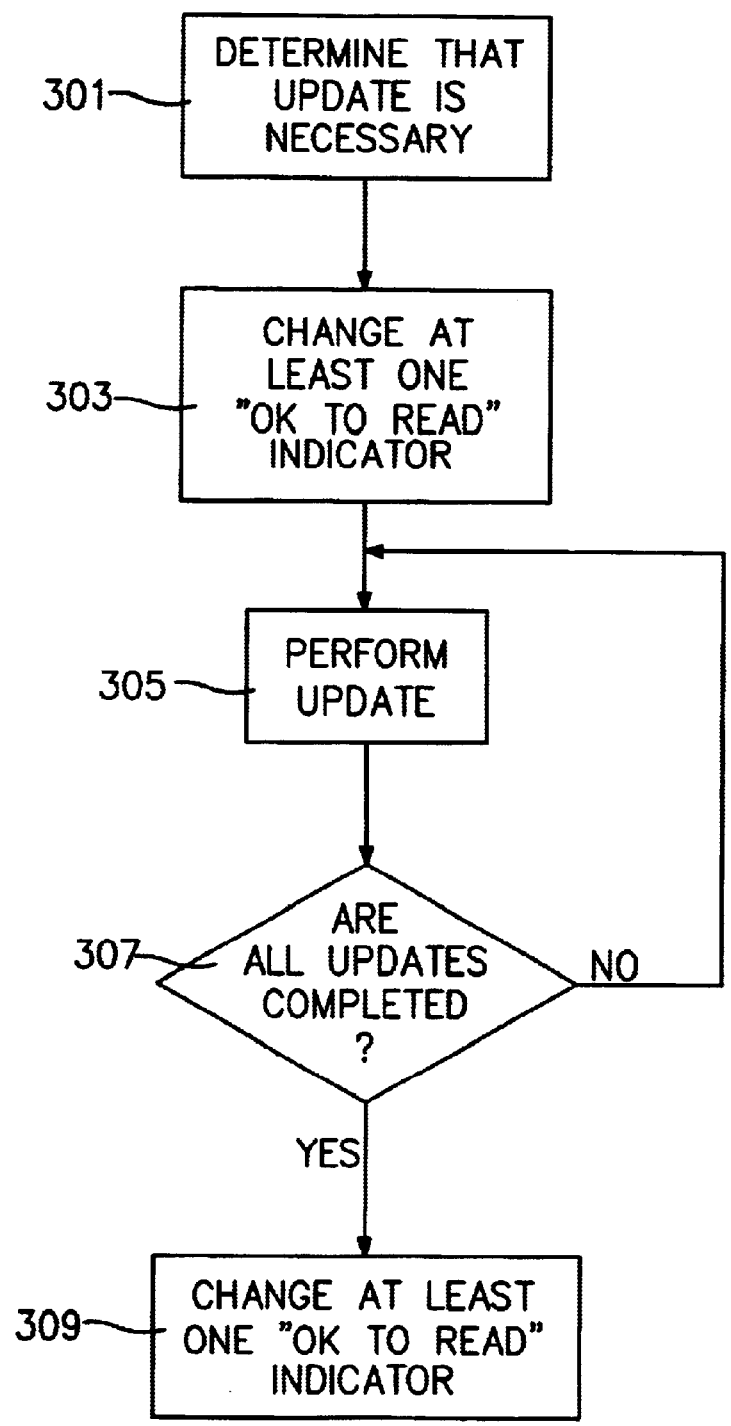
FIG. 3 provides a flowchart depicting a first representative process flow for an application to provide database updates in accordance with the present invention.

FIG. 3 provides a flowchart depicting a first representative process flow for providing database updates in accordance with the present invention. As a first step, a first application, APP1, determines that an update to DB1 is necessary, as depicted at 301. Next, APP1 changes as least one oktoread indicator in the configuration data at 303. After the indicator has been changed at the configuration data level, the update is performed at the database level (with any attendant directory changes also being implemented locally) at 305. If all updates have been completed, as determined at decision box 307, then the at least one oktoread indicator in the configuration system is changed back at step 309 and APP1's processing of the database is complete.

Figure 4:
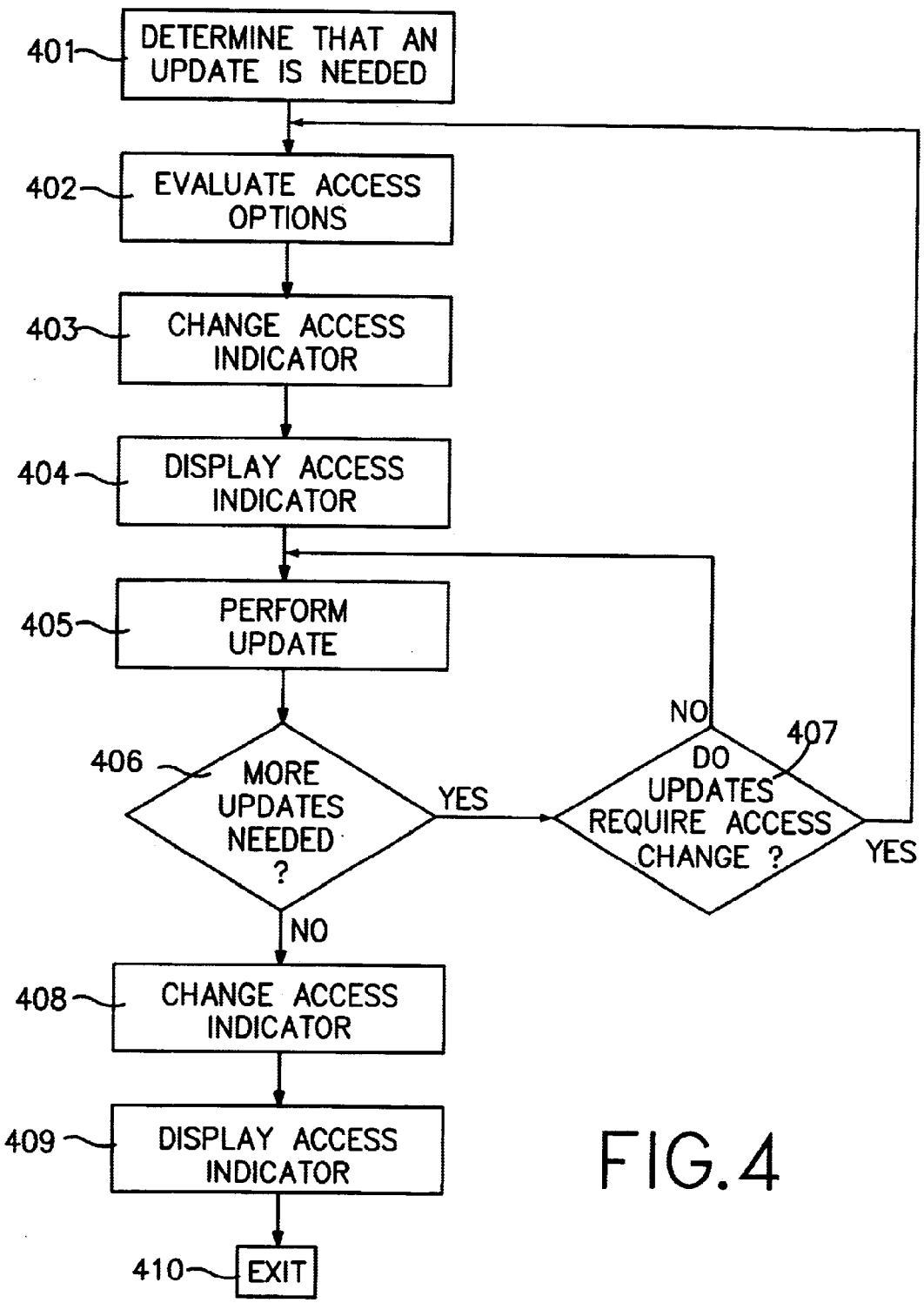
FIG. 4 provides a flowchart depicting an alternative representative process flow for an application to provide database updates in accordance with the present invention.

FIG. 4 provides a flowchart depicting an alternative representative process flow for providing database updates in accordance with the present invention. When it has been determined by APP1 that an update is needed, at 401, the application next evaluates access options at 402 to determine what granularity of access should be implemented during the update. If it is determined that the node should be inaccessible in its entirety during the update, then the oktoread indicator is set to "NO" for the entire node. Alternatively, oktoread indicator's may be set for only those items of data (e.g., keys) which are in need of being updated. Once the access options have been evaluated at 402, then the access indicator(s) associated with the node or the data stored in the node are changed at step 403. As an additional optional step, the access indicator(s) can be displayed to an end user via the graphical user interface (GUI), as depicted at step 404. Once the configuration data has been changed, any other application will be effectively on notice that the data may not be current, and APP1 can proceed with the updating at step 405. APP1 determines at step 406 if any additional update is required for this particular database. If an additional update is required, it should be determined if the additional update will require a change in access, as shown at decision box 407. The APP1 may decide that certain database changes necessitate an indication that the node should not be read, or simply that an item of data should not be read. The determination only influences an indicator and does not, as mentioned above, result in any blocking or locking of data pending completion of the update. Should a change in indication be required, as determined at 407, APP1 will repeat steps 403–406. If no change is required, the additional update will simply be performed at 405 and the process flow continue. If not additional updates are needed, as determined at 406, APP1 will change any access indicators in the configuration data back at 408 so that any applications accessing the configuration data will know that the node/data is "oktoread" and that no updates are currently in process. The optional step of displaying the changes access indicator is shown at 409 and APP1 exits at 410.

Figure 5:
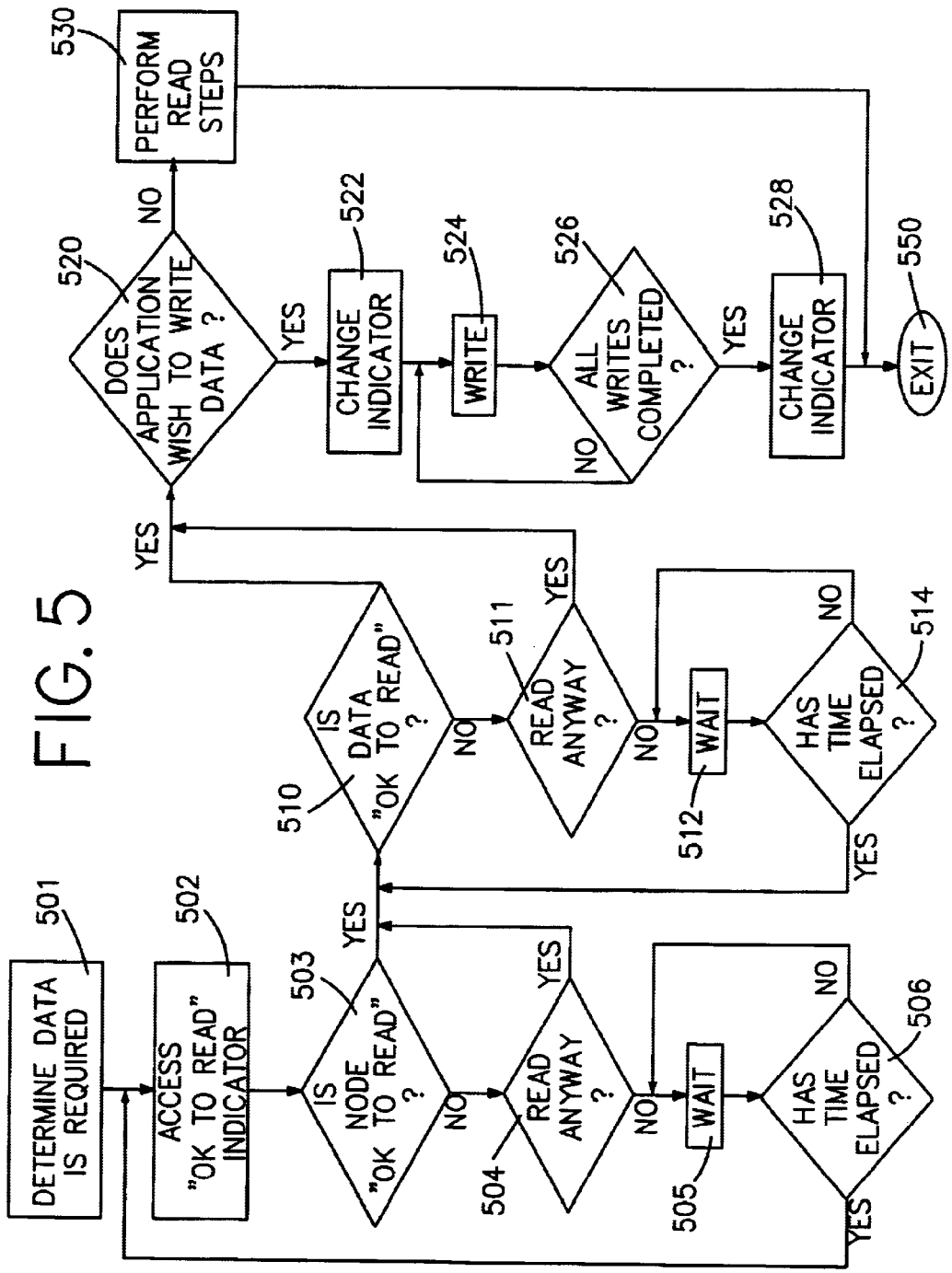
FIG. 5 provides a flowchart depicting a representative process flow for an application to access data in accordance with the present invention.

FIG. 5 provides a flowchart depicting a representative process flow for an application to access data in accordance with the present invention. At step 501, the application, hereinafter referred to as APP2, determines that it requires data. APP2 does not prepare to perform a distributed transaction to the database, however. Rather, APP2 accesses the relevant configuration data at 502 to determine if any updates are in process for the required data. Since APP1 could set both node-level and key/data-level oktoread access indicators, a two-level process flow will be depicted. It will be apparent to one having skill in the relevant art that some steps may be eliminated if only one level of indicator is implemented for the system. As shown, the APP2 first determines if an oktoread indicator has been set to "no" for the node at 503. If such an indicator has been set to "no", APP2 may either choose to read the node knowing that it will not have the most updated information, or may choose to wait. Decision box 504 shows the step of determining whether to read the node in spite of the indicator. If APP2 decides not to read the node, it will wait at 505 until a predetermined time has elapsed. Once it is determined that the predetermined time has elapsed, at 506, APP2 will again look to the configuration data at 502 and proceed.

If the node indicator shows that the node it ok to read, or if the application chooses to ignore the node indicator, the process flow will proceed to step 510 at which it is determined if data indicator shows that the data is ok to read. If the data oktoread indicator is set to "no", then APP2 can again choose to ignore the indicator at step 511 or can wait at 512 until it is determined that a pre-set time has elapsed at 514 after which the data indicator is checked again (step 510). Once the application decides to go forward with accessing the data, an optional decision can be made at 520 as to whether APP2 wishes to update the data, assuming write access, of course. If APP2 does not wish to update the data, or if APP2 does not have write access, then APP2 performs read steps at 530 and exits at 550. If however the APP2 has write access and has an update for the stored data, it must (as per FIG. 3) first change the at least one oktoread indicator at 522, perform its update processing at 524 and 526, and then change the at least one oktoread indicator back at 528 prior to exiting at 550.

As is detailed in the aforementioned co-pending patent application, the Configuration Service provides the services to allow the DKS component to store and retrieve configuration information for a variety of other services from anywhere in the networks. One particular usage is when the physical scope configuration will be stored in the Configuration Services so that IP drivers and other applications can access the information. Similarly, under the present invention, the update statue configuration data will be stored so that applications can access the information without having to perform a database-specific transaction. As alluded to above, an application may choose to "ignore" the oktoread indicator and proceed to read the non-updated data anyway. The present implementation at the configuration service layer does not prohibit an application from accessing the underlying data. The non-blocking approach is particularly advantageous for a large-scale distributed network.

Other particular advantages, which may already have become apparent to the reader, include the fact that applications effectively perform their own synchronization of data independent of the database, independent of the database access device drivers, and independent of the programming language. A simple update to a status indicator at the configuration service is adequate to place all applications on notice about the pending update. Under circumstances of backup/restore processing, booting, failover support when databases go down, etc., when temporary read only data conditions are appropriate, the present inventive approach is particularly effective. Furthermore, the configuration data is available to all applications without requiring that each consumer of the configuration data implement a database-specific distributed transaction, which will undoubtedly save on unnecessary duplication of effort. Finally, there is no requirement of a relationship (e.g., hierarchical structure) between data nodes in order for synchronization to be effectively implemented.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for implementing database updates by an updating application to at least one entry in a distributed database system of a distributed computing system, said distributed database system including at least one storage location having a database level comprising at least one database for storage of at least one entry and at least one higher level for providing application access to said at least one database level, wherein more than one application can access and update data in the distributed database system, comprising the steps of:

setting an indicator at said at least one higher level to indicate update status;

said updating application updating the at least one entry without blocking access to said at least one entry; and said updating application resetting said indicator at said at least one higher level to indicate read status after updating.

2. The method of claim 1 wherein said setting of said indicator by said application comprises setting an update indicator for the node on which the database resides.

3. The method of claim 2 wherein said distributed computing system includes at least one display device, said method further comprising displaying said indicator at said at least one display device.

4. The method of claim 1 wherein said setting of said indicator by said application comprises setting an entry update indicator for at least one specific database entry.

5. The method of claim 4 further comprising setting of a node update indicator for the node on which the database resides.

6. The method of claim 5 wherein said distributed computing system includes at least one display device, said method further comprising displaying at least one of said entry update indicator and said node update indicator at said at least one display device.

7. The method of claim 1 wherein said distributed computing system includes at least one display device, said method further comprising displaying said indicator at said at least one display device.

8. The method of claim 4 wherein said distributed computing system includes at least one display device, said method further comprising displaying said entry update indicator at said at least one display device.

9. A method for an application to access at least one data entry in a distributed database system of a distributed computing system, said distributed database system including at least one storage location having a database level comprising at least one database for storage of at least one entry and at least one higher level for providing application access to said at least one database level, wherein more than one application can access and update data in the distributed database system, comprising the steps of:
   accessing at least one entry in said higher level to determine the update status of data in said database; and
   determining database processing based on said update status, wherein said determining comprises one of accessing said data for processing when said update status indicates that another application is updating said data and waiting until said update status indicates that another application has completed updating of said data before accessing said data.

10. A method for an application to establish the granularity of access to data stored in a distributed database system of a distributed computing system, said distributed database system including at least one storage location having a database level comprising at least one database for storage of at least one entry and at least one higher level for providing application access to said at least one database level, wherein more than one application can access and update data in the distributed database system, comprising the steps of:
   determining node level access to said data;
   setting a node level access indicator at said at least one higher level to indicate non-blocking node level access during an update;
   determining data level access; and
   selectively setting at least one data level access indicator at said at least one higher level to indicate non-blocking data level access during said update based on the data to be updated.

11. The method of claim 10 wherein said computing system further comprises at least one display device and further comprising displaying said at least one access indicator at said at least one display device.

12. The method of claim 10 further comprising updating said data.

13. The method of claim 12 further comprising resetting said at least one data level access indicator after said updating.

14. A program storage device readable by machine tangibly embodying a program of instructions executable by the machine to perform method steps for implementing database updates by an updating application to at least one entry in a distributed database system of a distributed computing system, said distributed database system including at least one storage location having a database level comprising at least one database for storage of at least one entry and at least one higher level for providing application access to said at least one database level, wherein more than one application can access and undate data in the distributed database system, said method comprising the steps of:
   an updating application setting an indicator at said at least one higher level to indicate update status;
   said updating application updating the at least one entry without blocking access to said at least one entry; and
   said updating application resetting said indicator at said at least one higher level to indicate read status after updating.

15. The program storage device of claim 14 wherein said setting of at least one higher level indicator comprises setting an indicator for the node on which the database resides.

16. The program storage device of claim 14 wherein said setting of at least one higher level indicator comprises setting an indicator for at least one specific database entry.

17. The program storage device of claim 16 further comprising setting at least one higher level indicator for the node on which the database resides.

18. The program storage device of claim 14 wherein said distributed computing system includes at least one display device, said method further comprising has completed updating of said data before accessing said data.

19. A program storage device readable by machine tangibly embodying a program of instructions executable by the machine for performing a method for an application to access at least one data entry in a distributed database system of a distributed computing system, said distributed database system including at least one storage location having a database level comprising at least one database for storage of at least one entry and at least one higher level for providing application access to said at least one database level, wherein more than one application can access and update data in the distributed database system, said method comprising the steps of:
   accessing at least one entry in said higher level to determine the update status of data in said database; and
   determining database processing based on said update status, wherein said determining comprises one of accessing said data for processing when said update status indicates that another application is updating said data and waiting until said update status indicates that another application
   selectively setting at least one data level access indicator at said at least one higher level to indicate non-blocking data level access during said update based on the data to be updated.

20. A program storage device readable by machine tangibly embodying a program of instructions executable by the machine for performing a method for an application to establish the granularity of access to data stored in a distributed database system of a distributed computing system, said distributed database system including at least one storage location having a database level comprising at least one database for storage of at least one entry and at least one higher level for providing application access to said at least one database level, wherein more than one application can access and update data in the distributed database system, said method comprising the steps of:
   determining node level access to said data;

setting a node level access indicator at said at least one higher level to indicate non-blocking node level access during an update;

determining data level access; and displaying said at least one higher level indicator at said at least one display device.

* * * * *